United States Patent [19]

Gisser et al.

[11] 3,972,864
[45] Aug. 3, 1976

[54] COPOLYMERS OF METHYL α-N-ALKYLACRYLATE AND METHYL METHACRYLATE

[75] Inventors: Henry Gisser, Philadelphia; Helen E. Mertwoy, Dresher, both of Pa.

[73] Assignee: The United States of America as represented by the Secretary of the Army, Washington, D.C.

[22] Filed: Feb. 19, 1975

[21] Appl. No.: 551,185

[52] U.S. Cl. .............................. 526/328; 526/218; 526/227
[51] Int. Cl.² ................ C08F 220/10; C08F 220/14
[58] Field of Search ............................... 260/86.1 E

[56] References Cited
UNITED STATES PATENTS

| | | |
|---|---|---|
| 3,360,590 | 12/1967 | Liepins .......................... 260/89.5 A |
| 3,595,840 | 7/1971 | Moberly et al. ............... 260/89.5 A |
| 3,687,922 | 8/1972 | Gisser et al. .................... 260/89.5 A |
| 3,772,258 | 11/1973 | Lachowicz ..................... 260/86.1 E |

*Primary Examiner*—Harry Wong, Jr.
*Attorney, Agent, or Firm*—Nathan Edelberg; Robert P. Gibson; Kalman Pollen

[57] ABSTRACT

Methyl methacrylate and methyl α-n-alkylacrylate wherein the alkyl group may vary from 10 to 22 carbon atoms copolymerize at about 50°C in the presence of azobisisobutyronitrile to form polymers having low coefficients of friction and good wear properties.

6 Claims, No Drawings

COPOLYMERS OF METHYL α-N-ALKYLACRYLATE AND METHYL METHACRYLATE

The invention described herein may be manufactured, used and licensed by or for the Government for governmental purposes without the payment to us of any royalty thereon.

This invention relates to lubricants, and more particularly to copolymers of α-n-alkylacrylates and methyl methacrylate (MMA), the copolymer being useful for reducing the friction of sliding surfaces.

Copolymers of α-n-alkylacrylate and methyl methacrylate are herein disclosed for the first time. The only copolymers of methyl α-n-alkylacrylates previously reported are the copolymers of methyl α-n-alkylacrylates with styrene, alkyl butyl.

In accordance with this invention polymers are produced which are useful as solid lubricants, friction reducing additives for lubricants, or lubricants for mechanical parts such as gears subject to friction and wear.

It is thus an object of the invention to provide new friction reducing compositions.

Another object of the invention is to provide copolymers having good wear resistant properties.

The alkyl group of the methyl α-n-alkylacrylate may vary from 10 to 22 carbon atoms, a preferred number of carbon atoms in the alkyl group being 16–18. Our polymerization reaction may be catalyzed by catalysts including azobisisobutyronitrile or benzoyl peroxide whereby free radical polymerization takes place.

In general the greater the percentage of methyl methacrylate present in the copolymer the harder the resulting copolymer. Thus, for example, when methyl α-n-alkylacrylate and methyl methacrylate are present in 1:1 ratio, the copolymer is generally a solid. However, the polymer usually forms as a softer solid when the ratio of methyl α-n-alkylacrylate to methyl methacrylate is increased to 2:1.

The coefficients of friction of the copolymers were determined using a modified Bowden-Leben machine in which the tangential force on a given copolymer surface consisting of thin dry film on glass was detected by strain gauges mounted on a strain ring, the signals being amplified and recorded. All measurements were made using 100 and 200 gm loads, there being no significant difference in the coefficient of friction with either load. The sliding speed was 0.04 cm/sec.

It is important to prepare the methyl α-n-alkylacrylates free of any isomeric impurities to effect optimum copolymerization. For preparing the isomer free methyl α-n-alkylacrylate the procedure by Gisser-Mertwoy described in U.S. Pat. No. 3,687,922 and in example I which follows is suitable.

EXAMPLE I

Preparation of methyl α-n-octadecylacrylate:

After addition of dimethyl malonate (0.50 mole) to a solution of sodium methylate (0.50 mole in 400 ml methanol), octadecyl bromide (0.45 mole) is added dropwise. The reaction mixture was heated gently during the addition and the mixture was refluxed for 10 hours after addition of the halide. At the end of this time, the methanol was distilled off. The residue was cooled and stirred with 500 ml of water. The product, a pasty solid, floated on top of the water, and ether (350 mole) was added to dissolve it. The ether layer was evaporated, and the product was recrystallized from 900 ml of methanol. After recrystallization from methanol and drying in a vacuum oven, a 69.2 percent yield was obtained, m.p. 45°–47° C. The dimethyl-n-octadecylmalonate (0.17 mole), dissolved in 200 ml of methanol, was added to a solution of 11.3g potassium hydroxide (86.1 percent) in 45 ml of methanol. The mixture was stirred for 1.5 days and the potassium salt which separated was filtered. The salt was dissolved in 500 ml of water with stirring. After acidifying with 6N HCl, the solution was stirred for 3 hours to flocculate the precipitate. The product was filtered, washed and dried in a vacuum oven. A 95 percent yield was obtained, m.p. 68°–70° C. Methyl hydrogen octadecylmalonate (0.16 mole), diethyl amine (0.16 mole), and 13g of a 37 percent formaldehyde solution were stirred with heating to initiate the reaction, after which stirring was continued without heating for 6 hours. After standing overnight, impure solid acrylate had settled out. The pasty product layer was washed with hydrochloric acid followed by water until neutral (sodium sulfate was used to break emulsions formed during the washing). The ether layer was dried over anhydrous potassium carbonate. The solution was filtered and evaporated. The compound was crystallized from benzene. A 40 percent yield was obtained, m.p. 48°–50°C.

EXAMPLE II

Preparation of copolymer of methyl methacrylate and methyl α-n-octadecylacrylate:

0.003 Moles of methyl α-n-octadecylacrylate, 0.003 moles of methyl methacrylate, and 0.002 g of azobisisobutyronitrile are placed into polymerization tubes. The tubes containing these reactants are alternately evacuated and filled with nitrogen to remove any trace of oxygen or moisture. The tubes are next sealed and then heated about 2 days in an oven at 50°C during which the viscosity of the resulting composition within the tubes gradually increases. When there is no apparent further visual change in that viscosity the polymerization is assumed to have terminated. The tubes are opened after their contents have cooled to room temperature. The contents will then be dissolved in toluene, the solution filtered, the copolymer precipitated with methanol, and the methanol decanted. The copolymer is dried in a vacuum oven (40°C) to constant weight. Dissolving in toluene and precipitating in methanol is repeated until the infrared spectrum of the copolymer indicates it is free from unreacted methyl α-n-octadecylacrylate. Thus, the absorption bands for olefin linkages at 1631 cm$^{-1}$ (—C=C—C=O) and 935 cm$^{-1}$ (R—C(C=O)=CH$_2$) found in the infrared spectra of α-n-alkylacrylates will have disappeared and a slight shift of the absorption band at 1730 cm$^{-1}$ (characteristic of α, β-unsaturated esters) to 1739 cm$^{-1}$ (characteristic of saturated esters) will appear. Any unreacted methyl methacrylate will have been removed during the heating in the vacuum oven.

Table I below indicates percentage conversion and reaction time of various free radical catalyzed copolymerizations of methyl α-n-alkylacrylate and methyl methacrylate. Table II below cites examples of coefficient of friction studies made on thin dry films (on glass) of homopolymers of each reacting monomer as well as the copolymers formed therefrom. Regarding the copolymers it is evident from Table II that an increase in percentage of methyl α-n-alkylacrylate is accompanied by a decrease in the coefficient of friction of the resulting copolymer.

TABLE I

FREE RADICAL CATALYZED COPOLYMERIZATIONS OF METHYL α-n-ALKYLACRYLATE ($CH_2=C(R)-COOCH_3$) ($M_1$) AND MMA ($M_2$) AT 50°C

Catalyst: Azobisisobutyronitrile (.0002 g)

| $M_1$ R | $M_1$ Moles | $M_2$ Moles | $M_1$ % | Reaction Time, Days | Conv. % | Copolymer[a] %$M_1$ | C% | H% | O% | Mol.wt.[b] |
|---|---|---|---|---|---|---|---|---|---|---|
| $C_{16}H_{33}$ | .003 | .003 | 50% | 2 | 30 | 25 | 68.58 | 10.49 | 20.48 | 10,000 |
| $C_{16}H_{33}$ | .003 | .0015 | 67% | 14 | 36 | 54 | 73.61 | 11.56 | 14.54 | 9,980 |
| $C_{18}H_{37}$ | .003 | .003 | 50% | 7 | 36 | 38 | 72.03 | 11.09 | 16.90 | 16,170 |
| $C_{18}H_{37}$ | .003 | .0015 | 67% | 14 | 40 | 53 | 74.25 | 11.71 | 14.30 | 16,600 |

[a]Calculated from carbon analyses
[b]Number average molecule weight determined by vapor pressure osmometry

TABLE II

EFFECT OF CHAIN LENGTH OF ALKYL GROUP ON THE COEFFICIENTS OF FRICTION OF METHYL α-n-ALKYLACRYLATE ($M_1$) HOMOPOLYMERS[a] AND COPOLYMERS WITH MMA ($M_2$) AND EFFECT OF PERCENTAGE METHYL α-n-ALKYLACRYLATE IN COPOLYMER ON COEFFICIENT OF FRICTION, $\mu_f$

| Polymer | $M_1$ % | $M_2$ % | Mol.wt. | $\mu_f$ |
|---|---|---|---|---|
| A. Homopolymers[a] | | | | |
| Poly(Methyl Methacrylate) | — | 100 | >20,000 | .23 |
| Poly(Methyl α-n-Hexadecylacrylate) | 100 | — | 7,083 | .12 |
| Poly(Methyl α-n-Octadecylacrylate) | 100 | — | 1,380 | .10 |
| B. Copolymers with MMA | | | | |
| Poly(Methyl α-n-Hexadecylacrylate) | 25 | 75 | 10,000 | .14 |
| Poly(Methyl α-n-Hexadecylacrylate) | 54 | 46 | 9,980 | .12 |
| Poly(Methyl α-n-Octadecylacrylate) | 38 | 62 | 16,170 | .14 |
| Poly(Methyl α-n-Octadecylacrylate) | 53 | 47 | 16,600 | .12 |

We claim:

1. A method for the copolymerization of methyl methacrylate and methyl α-n-alkylacrylate, said methyl α-n-alkylacrylate having the formula

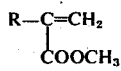

where R is an alkyl having the formula $C_nH_{2n+1}$ where n is at least 10 and not greater than 22, the mole ratio of the reactants methyl methacrylate to methyl α-n-alkylacrylate being in the range from 1:1 to 1:2, and comprising the steps of:
preparing a pure, isomer free, methyl α-n-alkylacrylate; adding said methyl methacrylate and a catalyst selected from the group consisting of azobisisobutyronitrile and benzoyl peroxide to said methyl α-n-alkylacrylate to form a mixture; and heating said mixture at about 50°C in an oxygen free and moisture free atmosphere until polymerization of the reactants is completed.

2. Process according to claim 1 wherein said

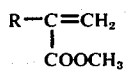

is methyl α-n-hexadecylacrylate.

3. Process according to claim 1 wherein said

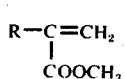

is methyl α-n-octadecylacrylate.

4. Copolymers, which are reaction products of the free radical copolymerization of methyl methacrylate and methyl α-n-alkylacrylate, said methyl α-n-alkylacrylate having the formula $$R-\underset{COOCH_3}{\overset{}{C}}=CH_2$$

wherein R is an alkyl having the formula $C_nH_{2n+1}$ where n is at least 10 and not greater than 22, the mole ratio of methyl methacrylate to methyl α-n-alkylacrylate in said free radical copolymers being in the range from 3:1 to 46:54, said free radical copolymers having an average molecular weight of from 9,980 to 16,600, said average molecular weight being conveniently determined by vapor pressure osmometry.

5. Copolymer according to claim 4 wherein said

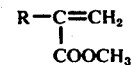

is methyl α-n-hexadecylacrylate.

6. Copolymer according to claim 4 wherein said

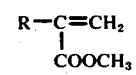

is methyl α-n-octadecylacrylate.

* * * * *